United States Patent
Geiersberger et al.

[15] 3,658,549
[45] Apr. 25, 1972

[54] CALCIUM SODIUM PHOSPHATE FEED SUPPLEMENTS

[72] Inventors: Karl Geiersberger, Deutz-Kolker Str. 66, Cologne-Deutz; Gerhard Grams, Eiserfelder Str. 3, Cologne-Brueck, both of Germany

[22] Filed: July 22, 1969

[21] Appl. No.: 843,830

[30] Foreign Application Priority Data

July 23, 1968 Germany ..................P 17 92 109.4

[52] U.S. Cl. ............................................99/2 CD
[51] Int. Cl. .....................................................A23k 1/175
[58] Field of Search ....................99/2 CD, 2, 4; 23/105, 106, 23/108; 71/46, 47

[56] References Cited

UNITED STATES PATENTS 3,058,804 10/1962 Tynan ....................................99/21 X
3,066,056 11/1962 Schlaeger et al. ........................23/108
3,101,999 8/1963 Malley et al. ...........................99/21 X
3,292,995 12/1966 Allen .....................................99/21 X

OTHER PUBLICATIONS

Chemical Abstracts, Volume 46– 8558 1952 Paul Blanc
Chemical Abstracts, Volume 51– 2406 1957 Hamamoto et al.
The Handbook of Feedstuffs, edited by Pfander and Seiden, 1957, Mineral Feeds, pages 295– 296.

*Primary Examiner*—Norman Yudkoff
*Assistant Examiner*—Kenneth P. Van Wyck
*Attorney*—Burns, Doane, Swecker & Mathis

[57] ABSTRACT

The synthesis of certain calcium sodium phosphates such as $CaNaPO_4$ and their use as mineral food supplements for mammals such as cows and pigs.

6 Claims, No Drawings

CALCIUM SODIUM PHOSPHATE FEED SUPPLEMENTS

DISCLOSURE

Mammals and particularly livestock such as cows and pigs, are known to require mineral feed supplements to a diet of vegetable fodder. The mineral supplements must in particular contain biologically acceptable phosphorus, and must also have a controlled calcium to phosphorus ratio of approximately 1:1 to 3:1, since phosphorus, like calcium, is one of the most important elements for nutrition. Since normal vegetable fodder contains too little phosphorus it is essential to supplement the animals' diet with additional phosphorus. A phosphorus deficiency greatly reduces the animals' productivity.

Prior phosphorus-containing feed supplements comprised among others, of defluorinated rock phosphate, dibasic calcium phosphate and sodium phosphates. The value of such supplements depends primarily on the ability of the phosphorus to be assimilated by the animal. Mineral preparations containing phosphorus which can readily be assimilated are more valuable for animal feeding than those in which the phosphorus is less readily assimilated. Rock phosphate and dibasic calcium phosphate are inexpensive but are not readily assimilated. Sodium phosphate is readily assimilated but employs phosphoric acid in its manufacture making it more expensive than dibasic calcium phosphate or rock phosphate.

It is therefore an object of the present invention to provide mineral feed supplements which could be more readily assimilated by animals than could dibasic calcium phosphate, and which could be simply and inexpensively produced.

The above and other objects are accomplished according to the present invention by the use of tertiary calcium sodium phosphates as mineral feed supplements.

A wide variety of calcium sodium phosphates are useful in the present invention. In a preferred embodiment these phosphates are the calcined reaction product of dibasic calcium phosphate and sodium carbonate. This calcined reaction product generally contains 15 to 35 and preferably 20 to 30 wt. % Ca; 30 to 55 and preferably 35 to 45 wt. % $P_2O_5$ and 5 to 18 wt. % Na. The calcined reaction product usually contains some $CaNaPO_4$ which is the most preferred calcium sodium phosphate.

Calcium sodium phosphates can be produced by reacting dibasic calcium phosphate with sodium carbonate, optionally in the presence of calcium carbonate, at an elevated temperature. The addition of calcium carbonate enables the calcium: sodium: phosphorus weight ratios to be adjusted to give the most favorable proportions for the type of animal in question (for the preparation see Gmelin "Handbuch der anorganischen Chemie," 8th Edition, Method No. 28, Part B/3, pages 1285 to 1286, Verlag Chemie, Weinheim, 1961). Calcium sodium phosphates in which the Ca: Na: P weight ratio is 1.3: 0.75: 1 have proved to be especially effective. Calcium sodium phosphates may be produced from rock phosphate by a sintering process by adding phosphoric acid and sodium salts. The apatite structure of the crude phosphate is completely destroyed by defluorination, and a calcium sodium salt of orthophosphoric acid is obtained.

While the calcium sodium phosphates of the present invention constitute effective nutritional aids for all mammals including man they are generally employed for the lower mammals (those other than man) such as domestic livestock and especially meat product producing mammals such as pigs, sheep, beef cattle and dairy cattle. These supplements can also be added to the diets of horses, mules and oxen.

The rate at which the calcium sodium phosphate as added to the mammals' diet is not critical and can vary widely. Even minute quantities give some beneficial results whereas amounts even approaching the mean lethal dosage are not harmful. Optimum amounts will depend upon factors such as the size and age of the mammal and whether it is still growing or has reached maturity as well as the amount of Ca, Na and P derived from other sources. The optimum amounts can be determined by those skilled in the art without undue experimentation. In general the calcium sodium phosphate can be substituted for dibasic calcium phosphate on an equal weight basis.

The invention is further illustrated by the following examples wherein all parts and percentages are by weight.

EXAMPLE I

One hundred forty-two parts of dibasic calcium phosphate containing 50% $P_2O_5$ and 40% CaO are mixed with 53 parts of sodium carbonate and calcined at 1,200° C. for 5 hours. One hundred sixty parts of a white, easily sintered product are obtained. This product when pulverized and subjected to X-ray analysis is shown to consist of a mixture of the high temperature ($\alpha$) and low temperature ($\beta$) modification of $CaNaPO_4$. The reaction product contains 44.4% $P_2O_5$ (of which 85 percent is soluble in ammoniacal ammonium citrate solution), 25.4% Ca and 14.5% Na; $CO_2$ can no longer be detected. The pH of an aqueous suspension with a weight ratio of 1 : 100 is 6.3.

EXAMPLE II

A mixture of 100 parts of dibasic calcium phosphate containing 50% $P_2O_5$ and 37.3 parts sodium carbonate is heat-treated at 600° C. in a rotary kiln with counter current flow of heating gases. When cooled and ground, the product contains 44% $P_2O_5$, 25.1% Ca, 14.4% Na and 0.4% $CO_2$. When suspended in water at a weight ratio of 1 : 100, it has a pH of 8.5. X-ray analysis reveals a mixture of $\alpha$ and $\beta$ $CaNaPO_4$.

EXAMPLE III

Four hundred eighty-four parts of dibasic calcium phosphate, containing 50% $P_2O_5$ and 40% CaO, are mixed with 63.6 parts of sodium carbonate and 38 parts of calcium carbonate, containing 53% CaO, and the mixture calcined at 1,200° C. for 5 hours. Three hundred twenty parts of a white product are obtained, which X-ray analysis shows to consist of the phase $$(CaO)_{2.6-2.4} \cdot (Na_2O)_{0.4-0.6} \cdot (P_2O_5)$$

with small quantities of $\beta$-$CaNaPO_4$. The chemical composition of the product is 44.4% $P_2O_5$, Na and 30% Ca. $CO_2$ can no longer be detected. When suspended in water with a weight ratio of 1 : 100, its pH is 6.1.

EXAMPLE IV

A calcium sodium phosphate which is of identical composition as far as X-ray analysis is concerned is made from crude phosphate. However, the $P_2O_5$ and Na content of the phosphate are less than in a phosphate made by the method of Example III.

EXAMPLE V

The usefulness of the phosphorus contained in the calcium sodium phosphates as an animal nutrient was tested by the rat test described in the "Zeitschrift fur Tierphysiologie, Tierernahrung und Futtermittelkunde," Volume 16, (1961), No. 2, Pages 97 to 118. By this method young, growing Albino rats are fed for 14 days on the diet being tested. The test diet consists of a basic feed in which the mineral supplement to be tested is included.

The increase in the weight (Z) of the experimental animals over the whole duration of the test is noted, and their skeletal development is ascertained from X-ray photographs in which the region of the knee-joint (F) is specially measured. A reference value B is calculated, on the basis of a series of tests with harmonized feeding:

$$B_{(1-3)} = 5.6 Z/F.$$

wherein $B_1$ is a rickets diet, giving the minimum value for Z and the maximum for F, $B_2$ is a controlled or balanced diet, containing just as much phosphorus as that being tested, and $B_3$ is the phosphorus containing diet being tested. Thus the phosphorus containing diet to be tested is compared with the rickets diet and the balanced one. The effectiveness of the diet being tested is then calculated as follows:

Effectiveness of $P = 100B_3/B_2 - B_1$.

An effectiveness of 70 to 90 is satisfactory and from 90 to 110 is good.

The calcium sodium phosphates made in accordance with Examples I and II have an effectiveness of 100 by this test; the calcium sodium phosphate made as in Example III, but from crude phosphate has an effectiveness of 79, while dibasic calcium phosphate has an effectiveness of approximately 75.

EXAMPLE VI

The procedure of Example V is repeated except that the rats are replaced respectively with cows, pigs and sheep with similar results.

Some of the mineral feed supplements of the present invention thus come well above dibasic calcium phosphate in the scale of values. Calcium sodium phosphate of the composition obtained by the method of Example I or II is, therefore, an additive which is particularly suitable for meat product producing mammals since the phosphorus contained therein is virtually all in a form in which it can be assimilated and rapidly reabsorbed. The sodium content of the supplement has very favorable effects since such animals require a large quantity of sodium, which cannot be supplied solely by vegetable fodder with supplements of sodium chloride.

Although the invention has been described in considerable detail with reference to certain preferred embodiments thereof, it will be understood that variations and modifications can be effected within the spirit and scope of the invention as described above and as defined in the appended claims.

What is claimed is:

1. In a process for supplementing the diet of mammals with phosphates, the improvement comprising supplying the phosphate as a composition consisting of $CaNaPO_4$.

2. The process of claim 1 wherein the calcium sodium phosphate is the calcined reaction product of dibasic calcium phosphate and sodium carbonate.

3. In a process for supplementing the diet of mammals with phosphates, the improvement comprising supplying the phosphates as the calcined reaction product of dibasic calcium phosphate and sodium carbonate, the calcined reaction product consisting of a Ca:Na:P weight ratio of 1.3:0.75:1 and having the formula $CaNaPO_4$.

4. The process of claim 3 wherein the mammals are sheep.
5. The process of claim 3 wherein the mammals are cattle.
6. The process of claim 3 wherein the mammals are pigs.

* * * * *